United States Patent
Pufahl et al.

(10) Patent No.: US 11,347,376 B2
(45) Date of Patent: May 31, 2022

(54) DYNAMIC LIST COMPOSITION BASED ON MODALITY OF MULTIMODAL CLIENT DEVICE

(71) Applicant: Google LLC, Mountain View, CA (US)

(72) Inventors: April Pufahl, Mountain View, CA (US); Chrysoberyl Francisco, Zurich (CH); Jared Strawderman, San Jose, CA (US); Per Anderson, New York, NY (US); Oren Blasberg, New York, NY (US); Andrew Watson, Zurich (CH); Madelaine Plauché, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 144 days.

(21) Appl. No.: 16/155,728

(22) Filed: Oct. 9, 2018

(65) Prior Publication Data

US 2020/0110515 A1    Apr. 9, 2020

(51) Int. Cl.
   *G06F 3/0482* (2013.01)
   *G06F 3/0488* (2022.01)
   *G06F 3/16* (2006.01)
   *H04L 67/01* (2022.01)

(52) U.S. Cl.
   CPC .......... *G06F 3/0482* (2013.01); *G06F 3/0488* (2013.01); *G06F 3/167* (2013.01); *H04L 67/42* (2013.01)

(58) Field of Classification Search
   CPC ................ G06F 3/0482; G06F 16/957; G06F 2203/0381; G06F 3/16; G06F 3/167; G06F 40/14; G06F 3/0488; H04L 67/42
   See application file for complete search history.

(56) References Cited

U.S. PATENT DOCUMENTS

| | | | | |
|---|---|---|---|---|
| 10,001,900 | B2* | 6/2018 | Gallo | G06F 3/0481 |
| 10,249,300 | B2* | 4/2019 | Booker | G06F 3/167 |
| 2002/0003547 | A1* | 1/2002 | Wang | G06F 16/957 |
| | | | | 715/727 |
| 2002/0120645 | A1* | 8/2002 | Adapathya | G06F 16/9577 |
| | | | | 715/205 |
| 2002/0163543 | A1* | 11/2002 | Oshikiri | G06F 3/0482 |
| | | | | 715/810 |

(Continued)

OTHER PUBLICATIONS

Google Developers; Finding the Right Voice Interactions for Your App (Google I/O '17) https://www.youtube.com/watch?v=0PmWruLLUoE&t=4s May 18, 2017.

(Continued)

*Primary Examiner* — Wilson W Tsui
(74) *Attorney, Agent, or Firm* — Middleton Reutlinger

(57) ABSTRACT

Systems, methods, and apparatus for dynamically partitioning items in a list into one or more subsets in a manner tailored to a current modality of a client device is disclosed herein. Multimodal client devices can engage in a variety of interactions across the multimodal spectrum including voice only interactions, voice forward interactions, multimodal interactions, visual forward interactions, visual only interactions, etc. A list can be partitioned into subsets in part based on a currently modality of a multimodal device, one or more list attributes indicating additional information about the list, etc.

18 Claims, 9 Drawing Sheets

(56) References Cited

U.S. PATENT DOCUMENTS

| | | | | |
|---|---|---|---|---|
| 2006/0115799 | A1* | 6/2006 | Stephen | G09B 15/06 434/185 |
| 2006/0294466 | A1* | 12/2006 | Muller | G06F 9/451 715/719 |
| 2007/0211071 | A1* | 9/2007 | Slotznick | G06F 16/957 345/594 |
| 2007/0226635 | A1* | 9/2007 | Goebel | G06F 16/9577 715/745 |
| 2008/0162136 | A1 | 7/2008 | Agapi et al. | |
| 2009/0248419 | A1* | 10/2009 | Spaulding | G10L 15/22 704/275 |
| 2010/0008650 | A1* | 1/2010 | Bull | H04N 21/4126 386/200 |
| 2010/0064255 | A1* | 3/2010 | Rottier | G06F 3/0482 715/821 |
| 2010/0100899 | A1* | 4/2010 | Bradbury | G06Q 30/08 725/29 |
| 2010/0169097 | A1 | 7/2010 | Nachman et al. | |
| 2010/0194690 | A1* | 8/2010 | Wilairat | G06F 3/0237 345/168 |
| 2013/0035942 | A1* | 2/2013 | Kim | G06F 3/167 704/275 |
| 2013/0275138 | A1* | 10/2013 | Gruber | G10L 13/00 704/260 |
| 2013/0290879 | A1* | 10/2013 | Greisson | H04M 1/72522 715/764 |
| 2015/0012261 | A1 | 1/2015 | Walther | |
| 2015/0119108 | A1* | 4/2015 | Philbin | H04W 52/0274 455/566 |
| 2018/0011685 | A1 | 1/2018 | Weingartner | |

OTHER PUBLICATIONS

Google Developers; Defining Multimodal Interactions One Size Does Not Fit All (Google I/O '17) https://www.youtube.com/watch?v=fw27RFHP2tc&t=1s May 18, 2017.

Google Developers; Design Actions for the Google Assistant beyond smart speakers (Google I/O '18) https://www.youtube.com/watch?v=JDakZMIXpQo&t=623s May 9, 2018.

* cited by examiner

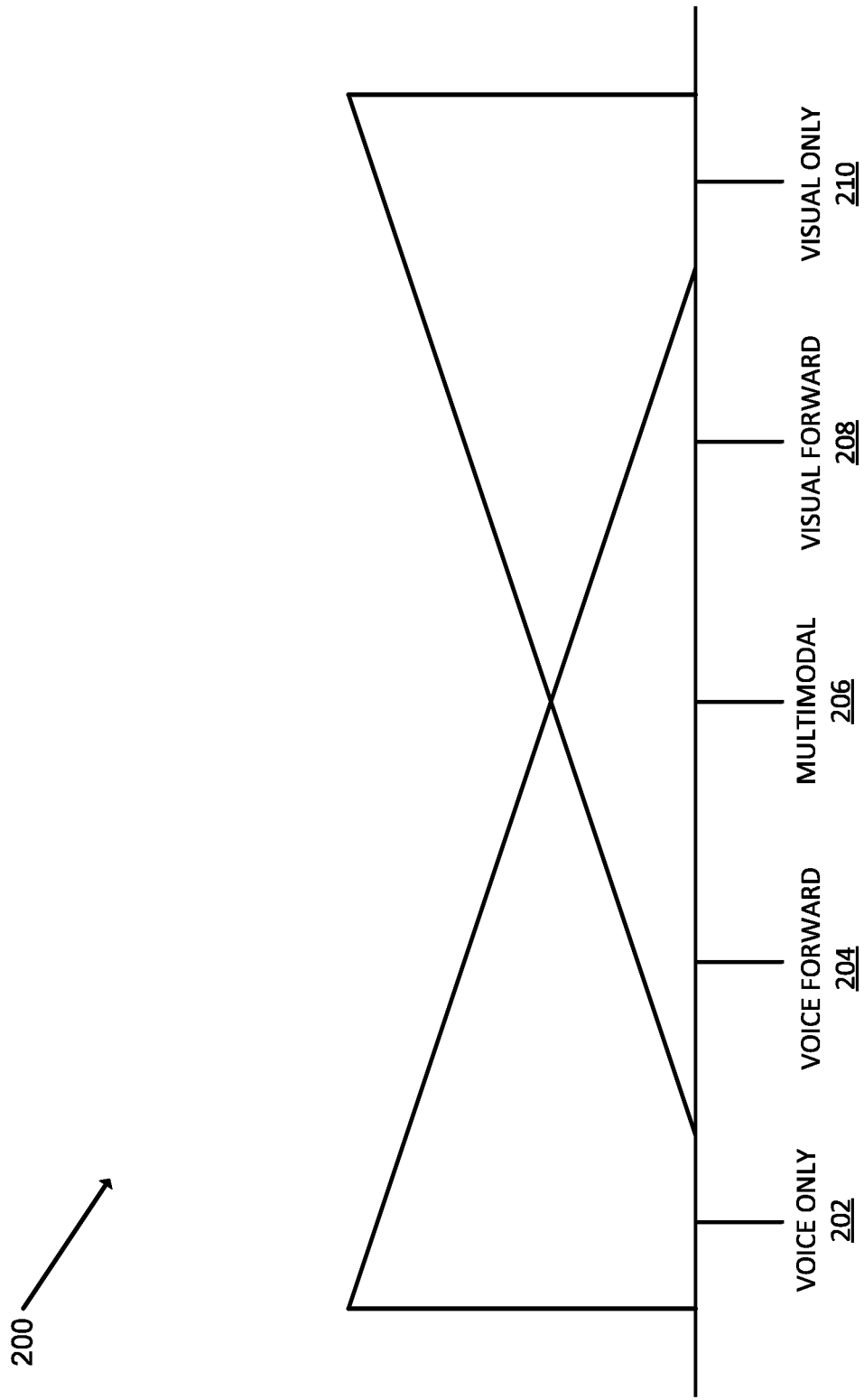

```
HYPOTHETICAL LIST A
500

ONE 502
TWO 504
THREE 506
FOUR 508
FIVE 510
SIX 512
SEVEN 514
EIGHT 516
NINE 518
TEN 520
```

FIG. 5

```
VOICE ONLY INTERACTION 600

[[AUDIO]] "TEN TOTAL ITEMS IN
THE LIST" 602

[[AUDIO]] "ONE" 604
[[AUDIO]] "TWO" 606
[[AUDIO]] "THREE" 608
[[AUDIO]] "FOUR" 610
[[AUDIO]] "FIVE" 612
[[AUDIO]] "SIX" 614

[[AUDIO]] "CONTINUE THE LIST?"
616

[[AUDIO]] "SEVEN" 618
[[AUDIO]] "EIGHT" 620
[[AUDIO]] "NINE" 622
[[AUDIO]] "TEN" 624
```

FIG. 6

```
MULTIMODAL INTERACTION 700

[[AUDIO]] "TEN TOTAL ITEMS IN THE LIST"
702

[[VISUAL]] ONE 704
[[VISUAL]] TWO 706
[[VISUAL]] THREE 708
[[VISUAL]] FOUR 710
[[VISUAL]] FIVE 712

[[AUDIO]] "FIVE TOTAL ITEMS REMAINING
IN THE LIST" 714

[[VISUAL]] SIX 716
[[VISUAL]] SEVEN 718
[[VISUAL]] EIGHT 720
[[VISUAL]] NINE 722
[[VISUAL]] TEN 724

[[AUDIO]] "THE LIST IS COMPLETE" 726

[[VISUAL]] SOURCE:
WWW.HYPOTHETICALURL.COM 728
```

FIG. 7

```
VISUAL ONLY INTERACTION 800

[[VISUAL]] "TEN TOTAL ITEMS IN THE
LIST" 802

[[VISUAL]] ONE 804
[[VISUAL]] TWO 806
[[VISUAL]] THREE 808
[[VISUAL]] FOUR 810
[[VISUAL]] FIVE 812
[[VISUAL]] SIX 814
[[VISUAL]] SEVEN 816
[[VISUAL]] EIGHT 818
[[VISUAL]] NINE 820
[[VISUAL]] TEN 822

[[VISUAL]] SOURCE:
WWW.HYPOTHETICALURL.COM 824
```

FIG. 8

HYPOTHETICAL LIST B 900

UNREAD TEXT MESSAGE FROM JANE 902
UNREAD TEXT MESSAGE FROM BOB 904
UNREAD TEXT MESSAGE FROM JANE 906
UNREAD TEXT MESSAGE FROM SAM 908

FIG. 9

VOICE ONLY INTERACTION 1000

[[AUDIO]] "FOUR TOTAL UNREAD TEXT MESSAGES" 1002

[[AUDIO]] "UNREAD TEXT MESSAGE FROM JANE" 1004

[[PAUSE]] 1006

[[AUDIO]] "UNREAD TEXT MESSAGE FROM BOB" 1008

[[PAUSE]] 1010

[[AUDIO]] "UNREAD TEXT MESSAGE FROM JANE" 1012

[[PAUSE]] 1014

[[AUDIO]] "UNREAD TEXT MESSAGE FROM SAM" 1016

FIG. 10

MULTIMODAL INTERACTION 1100

[[AUDIO]] "FOUR UNREAD TEXT MESSAGES INCLUDING TWO FROM JANE" 1102

[[VISUAL]] "UNREAD TEXT MESSAGE FROM JANE" 1104
[[VISUAL]] "UNREAD TEXT MESSAGE FROM BOB" 1106
[[VISUAL]] "UNREAD TEXT MESSAGE FROM JANE" 1108
[[VISUAL]] "UNREAD TEXT MESSAGE FROM SAM" 1110

FIG. 11

VISUAL ONLY INTERACTION 1200

[[VISUAL]] "FOUR UNREAD TEXT MESSAGES INCLUDING TWO FROM JANE" 1202

[[VISUAL]] "UNREAD TEXT MESSAGE FROM JANE" 1204
[[VISUAL]] "UNREAD TEXT MESSAGE FROM BOB" 1206
[[VISUAL]] "UNREAD TEXT MESSAGE FROM JANE" 1208
[[VISUAL]] "UNREAD TEXT MESSAGE FROM SAM" 1210

[[VISUAL]] "NO ADDITIONAL UNREAD TEXT MESSAGES" 1212

FIG. 12

DYNAMIC LIST COMPOSITION BASED ON MODALITY OF MULTIMODAL CLIENT DEVICE

BACKGROUND

An automated assistant (also known as a "personal assistant", "mobile assistant", etc.) can be implemented on a multimodal client device and/or on one or more remote computing devices, such as computing device(s) in "the cloud" that are connected to the multimodal client device via a network. Multimodal client devices can provide a user with multiple modes of interacting with the device. More particularly, a multimodal device has several modes available for a user to input data to the device and/or several modes available for a device to render output to a user.

For example, user input to a multimodal device can include spoken input (e.g., a user speaking), textual input (e.g., a user typing on a keyboard, a user entering text on a touch sensitive screen, etc.), gesture input (e.g., user hand motions, user gaze, user head movements, etc.), haptic input (e.g., applying a variety of forces to a client device such as squeezing a client device, picking up a client device, shaking a client device, placing a client device in a particular orientation, etc.), as well as other types of input (e.g., pressing a physical button on a client device, clicking a button in a user interface with a mouse, performing actions with a mouse such as using a mouse scroll wheel to move information on a screen up and/or down, etc.), etc. Similarly, a multimodal device can render output for a user in many ways including audio output (e.g., generating output using a speaker for a user to listen to), visual output (e.g., displaying text, images, video, etc. on a screen, flashing a light on a client device on and off, changing colors of a light on a device, etc.), haptic output (e.g., causing a client device to vibrate), etc.

SUMMARY

This disclosure relates to systems, methods, and apparatus for dynamically partitioning items in a list into one or more subsets for rendering to a user in a manner tailored to a current modality of a client device. The current modality of a client device can be one of a plurality of candidate modalities within a multimodal spectrum, and can indicate current methods of user interface input and/or client device output to be utilized. In some implementations, the multimodal spectrum of candidate modalities includes voice only interactions, voice forward interactions, multimodal interactions (also referred to as "intermodal interactions"), visual forward interactions, visual only interactions, and/or other modalities of interactions. A client device can utilize one or more modalities. For example, a client device can utilize voice only interactions, voice forward interactions, multimodal interactions, and/or visual only interactions. In some implementations, the current modality of the client device can be determined based on sensor data from one or more sensors of the client device. For example, a multimodal client device can determine its current modality using sensor data from one or more sensors such as a camera, an inertial measurement unit ("IMU"), a gyroscope, a positioning system (e.g., Global Positioning System ("GPS")), a microphone, a proximity sensor, a pressure sensor, and/or other sensor(s).

In many implementations, a multimodal client device can determine how to render a list tailored to the current modality of the client device of a user of the multimodal client device. For example, one or more items in a list can be partitioned into subsets. The number of items in a subset can be dynamically determined by the client device using current device modality, known information (with a user's permission), one or more modalities of user interface input, a determined intent of user interface input, the type of the client device, the location of the client device, the location of the user with respect to the client device, one or more list attributes, etc. List attributes in accordance with various implementations can include list size information (e.g., the number of items in a list, the number of words in each item in a list, the number of characters of each item in a list, the average number of characters for an item in the list, etc.), the type of list (e.g., an interactive list, a consumable list, etc.), and/or other attribute(s).

For example, in a voice only interaction, a client device can communicate, via a speaker, a twenty item list to a user in subsets each containing five items. In a visual only interaction, a client device can display the entire twenty item list on a screen for a user (i.e., a single subset). In some implementations, rendered audio output does not have to match rendered visual output. For example, a client device using a multimodal interaction, a voice forward interaction, and/or a visual forward interaction can communicate the twenty item list to a user by a combination of audio and visual outputs such as by rendering a five item subset via a speaker while displaying the entire twenty item list on a display screen. In many implementations, rendering a list on a multimodal client device can prioritize visually rendering a list via a display over an auditory rendering of a list via a speaker. In other words, in many implementations an entire list will only be rendered via a speaker when the client device lacks (or lacks access to) a display screen (i.e., a voice only interaction on a standalone interactive speaker and/or a multimodal device during a voice only interaction).

List attributes indicating the size of the list, such as the number of items in a list and/or the number of words in each item in a list, can be utilized in determining the number of items for a list subset. For example, a client device can partition a larger number of single word items into a subset and a smaller number of multiword items (e.g., sentences and/or phrases) into a subset. For example, a list of twenty-four single word items can be partitioned into six item subsets. Additionally or alternatively, a client device can partition a twenty-four item list, where each item is ten words long, into twelve subsets where each subset contains two items. In other words, a list of less dense information (i.e., fewer words per list item) can be partitioned into a subset with a greater number of items in a subset, while a list of denser information (i.e., more words per list item) can be partitioned into subsets with a smaller number of items in a subset.

The same list can be partitioned in to varying size subsets for different discrete client device modalities. For example, a list can be partitioned into three item subsets for a voice only interaction and partitioned into twenty item subsets for a visual only interaction. Additionally or alternatively, a list can be portioned into varying size subsets using one or more list attributes within the same discrete modality. For example, a list can be partitioned into a first subset of three items and a second subset of five items during a voice forward interaction. In other words, list attributes, such as the number of characters per item, can be utilized to further determine the number of items in a subset within a single client device modality.

In some implementations, a client device renders the entire list. In other implementations, the client device renders only a portion of the list. For example, when rendering subsets of the list via a speaker, the client device can pause between each subset, giving a user an opportunity to interact with the list (e.g., the user can stop rendering the list with user interface input such as "stop", "wait", "pause", and/or additional commands). Additionally or alternatively, a client device can ask a user if they wish to render additional subsets of a list. For example, a client device can render audio output asking if the client device should render an additional subset after reading the previous subset. As an additional example, after rendering a subset of a list via a display, a client device can provide the user with a continue button that, if selected, causes additional subsets of the list to be visually rendered.

Additionally or alternatively, a list type (e.g., an interactive list, a consumable list, and/or additional list type(s)) can be utilized in partitioning a list into subsets. For example, an interactive list can include items a user can respond to such as a list of unread emails, a list of unread text messages, etc. A consumable list can include items that generally do not change, such as a list of the ten tallest mountains in the world. In many implementations, a client device can partition interactive lists into smaller item subsets to give a user an opportunity to interact with an item in a list. For example, a list can contain the subject of a user's unread emails, and the list can be partitioned such that each unread email title is an individual subset, thus giving a user of the client device an opportunity to respond to each email while the list is being rendered.

In some implementations, items in a list can be part of a data structure containing additional list information such as one or more list attributes as well as one or more indications of how a client device should render portions of the list in different device modalities. In some implementations, the data structure can include spoken and/or visual output to render during a multimodal interaction for the start of a list, the middle of a list, the end of a list, and/or other point(s) in a list, while a user is scrolling through list items on a display screen. For example, the entire list can rendered on a display of a multimodal client device while output via a speaker at the start of the list can include an indication of the total number of items in the list, output via a speaker at the middle of the list can include the number of remaining items in the list, output via a speaker at the end of the list can indicate the list is complete via a speaker, output via the display can indicate when no more items are in the list can indicate the source of the list, etc.

Additionally or alternatively, a multimodal client device can determine one or more user intents from user interface input, and the determined intent(s) can be utilized in partitioning a list into one or more subsets. For example, user intent can include trivia (e.g., user interface input indicating a question such as "What are the islands of Hawaii?"), discovery (e.g., user interface input indicating an order to a list such as ordering types of dogs by "friendliest" for the received user interface input "What is the friendliest dog breed?"), select then act (e.g., user interface input indicating to organize a list and offer an action such as "I'm looking for a comedy show"), act but first select (e.g., user interface input indicating to disambiguate items in a list and then perform an action such as "Play Hypothetical Band"), etc.

A multimodal client device can receive an unstructured list and, as part of portioning a list into subsets, order the information from the unstructured list tailored to the current device modality. Additionally or alternatively, a client device can determine list attributes for an unstructured list.

In addition to device modality, items in an unstructured list can be partitioned into subsets using item complexity, user opinion of an item, etc.

In many implementations, dynamically tailoring a list to a client modality can provide computational efficiencies and/or reduced latency in client device output generation relative to always rendering the same complete list regardless of modality. Also, for example, in some implementations, a remote server can partition a list and transmit subsets of the list as requested by the user, thereby enabling faster and/or more efficient retrieval of an individual subset of the list and prevent unwanted portions of a (potentially large) list from ever being transmitted to the client device. As yet another example, many implementations enable a data structure to store contents of a list, and limited list attributes. Additionally or alternatively, dynamic generation of various renderings of the list to be generated based on only the list and the limited list attributes, in view of a current modality of a client device. Such storage of contents of a list and limited list attributes can consume less storage space than storage of separate variants of the list for each of multiple modalities of a client device and/or storage of a list with detailed instructions on how the list should be rendered in each of multiple modalities. These storage efficiencies can be significant in many situations where a large quantity of lists are stored and utilized.

Moreover, dynamic generation of list subsets tailored to a current device modality can additionally or alternatively directly result in various other efficiencies. For example, by portioning a list that is specifically tailored to a current modality, client device resources are not wasted in unnecessarily rendering one or more subsets of a list in a modality currently unavailable to a user. For instance, assume a client device has a current modality of "visual only" based on sensor data indicating the speaker of the client device is muted. Utilizing techniques disclosed herein, only visual output of the subset of the list can be provided in the "visual only" modality, thereby preventing the unnecessary simultaneous rendering of related audible output. Also, for example, dynamic generation of a list subset can reduce the quantity of user inputs and/or enable the automated assistant to more efficiently assist the user in performing a technical task. For example, during rendering of subset(s) of the list by an automated assistant to the user where the list output is tailored to the current modality, rendering the subset(s) of the list can be dynamically tailored to most efficiently convey information to the user in view of the modality during the dialog session. This can include rendering subset(s) of information sized for a user to best understand the information in the current modality such as rendering a smaller subset of items as an auditory output and/or rendering a longer subset of items as a visual output.

The above description is provided as an overview of some implementations disclosed herein. Additional description of these and other implementations is set forth in more detail herein.

In some implementations, a method is provided that includes receiving one or more instances of user interface input provided by a user of a multimodal client device. The method further includes determining, based on the processing of the user interface input, a list of a plurality of items is responsive to the user interface input. The method further includes determining, based at least in part on sensor data from one or more sensors of the client device, a current device modality of the multimodal client device, where the sensor data based on which the current device modality is determined is in addition to any sensor data generated by the one or more instances of user interface input. The method further includes determining a first subset of the list to render, where determining the first subset is based on one or more list attributes of the list and is based on the current modality of the client device. The method further includes causing the first subset of the list to be rendered by one or more user interface output devices of the multimodal client device.

These and other implementations of the technology described herein can include one or more of the following features.

In some implementations, upon receiving one or more instances of affirmative user input provided by the user of the multimodal client device in response to a query rendered by the one or more user interface output devices asking if an additional subset of the list should be rendered: the method further includes determining a second subset of the list to render based on the one or more list attributes and based on the current modality of the client device. In some versions of these implementations, the method further includes causing the second subset of the list to be rendered by the one or more user interface output devices of the multimodal client device. In other versions of these implementations, the method further includes receiving an unstructured list from the remote server, where the unstructured list is provided by a third party and has no list attributes. In some versions, the method further includes processing the unstructured list to determine one or more list attributes for use in determining the first subset of the list to render.

In some implementations, the method further includes receiving the list from the multimodal client device from a remote server, and generating the first subset of the list by the multimodal client device. In some versions of these implementations, the method further includes the multimodal client device receiving the list from the remote server in response to a request, transmitted to the remote server by the multimodal client device, that is based on the user interface input, and determining the current client device modality of the multimodal client device is by the multimodal client device and occurs after transmission of the request.

In some implementations, the method further includes the list attributes including the number of items in the list and the number of characters in each item in the list, and where the first portion of the list is determined based on the number of items in the list and the number of characters in each item in the list.

In some implementations, the method further includes the list attributes including an indication that the list is an interactive list, where the user can generate additional user interface input in response to an item in the interactive list. In other implementations, the method further includes monitoring, for a threshold duration after rendering the first item of the interactive list, for additional user input that is in response to the first item of the interactive list. In various other implementations, the method further includes: in response to not receiving additional user input during the monitoring, causing the second item of the interactive list to be rendered by the one or more user interface output devices of the multimodal client device.

In some implementations, the method further includes the current client device modality is a voice only interaction and the first subset of the list is rendered only via one or more speakers of the one or more user interface output devices.

In some implementations, the method further includes the current device modality is a multimodal interaction and the first subset of the list is rendered via one or more speakers of the one or more user interface output devices and via a touch screen of the one or more user interface output devices. In some of those implementations, the method further includes the first subset of the list is rendered via one or more speakers of the one or more user interface output devices, and the list of the plurality of items is rendered via the touch screen of the one or more user interface output devices. In many versions of those implementations, the method further includes additional output including the number of items in the list and the source of the list is rendered via the touch screen prior to rendering the list of the plurality of items. In some versions of those implementations, the method further includes determining the first subset of the list to render via the one or more speakers of the one or more user interface output devices is determined by randomly selecting three items in the list. In many versions of those implementations, the method further includes causing the number of items in the list to be rendered via the one or more speakers prior to rendering the first subset of the list. In some versions of those implementations, the method further includes determining an ordered list of the plurality of items by processing the list of the plurality of items by the multimodal client device, wherein the ordered list is in alphabetical order, and causing the ordered list of the plurality of items to be rendered via the touch screen.

In some implementations, the method further includes the current device modality is a voice forward interaction, the first subset of the list is rendered via a touch screen of the one or more user interface output devices, and additional output is rendered via a speaker of the one or more user interface output devices, where the additional output includes an indication of the number of items in the list and an indication that the first subset of the list is rendered via the touch screen.

In some implementations, the method further includes the current device modality is a visual only interaction and the first subset of the list is rendered only via a touch screen of the one or more user interface output devices.

In some implementations, the method further includes determining, based on the processing of the first subset of the list, an epithet describing each item in the first subset of the list, and causing the epithet to be rendered following each item in the first subset of the list by the one or more user interface output devices of the multimodal client device.

In many implementations a method is provided that includes receiving, via a network interface at one or more server devices remote from a multimodal client device, one or more instances of user interface input and a current client device modality. The method further includes the user interface input is provided by a user of a multimodal client device. The method further includes the user interface input is processed to determine a list of plurality of items responsive to the user interface input. The method further includes the current client device modality is based at least in part on sensor data from one or more sensors of the multimodal client device. The method further includes the sensor data based on which the current client device modality is determined is in addition to any sensor data generated by the one or more instances of user interface input. The method further includes determining a first subset of the list based on one or more list attributes of the list and based on the current modality of the client device. The method further includes transmitting, for rendering by one or more user interface output devices of the multimodal client device, the first subset of the list to the multimodal client device via the network interface.

In some implementations, the method further includes transmitting the list of the plurality of items for additional processing by the multimodal client device in addition to transmitting the first subset of the list to the multimodal client device via the network interface. In some of those implementations, the method further includes the current device modality is a multimodal interface, the first portion of the list is rendered via one or more speakers of one or more user interface output devices of the multimodal client device, and the list of plurality of items is rendered via a touch screen of the one or more user interface output devices of the multimodal client device.

In a variety of implementations, a method is provided that includes receiving one or more instances of user interface input provided by a user of a multimodal client device. The method further includes receiving, based on the processing of the user interface input by one or more servers remote to the multimodal client device, an unstructured list of a plurality of items responsive to the user interface input from the one or more servers via a network interface. The method further includes determining, based at least in part on sensor data from one or more sensors of the client device, a current client device modality of the multimodal client device. The method further includes the sensor data based on which the current device modality is determines is in addition to any sensor data generated by the one or more instances of user interface input. The method further includes determining, based on processing of the unstructured list, one or more list attributes of the unstructured list. The method further includes determining a first subset of the unstructured list to render, wherein determining the first subset is based on the one or more list attributes of the unstructured list and is based on the current modality of the client device. The method further includes causing the first subset of the unstructured list to be rendered by one or more user interface output devices of the multimodal client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example multimodal spectrum according to implementations disclosed herein.

FIG. 5 illustrates an example list according to implementations disclosed herein.

FIG. 6 illustrates rendering an example list during a voice only interaction according to implementations disclosed herein.

FIG. 7 illustrates rendering an example list during a multimodal interaction according to implementations disclosed herein.

FIG. 8 illustrates rendering an example list during a visual only interaction according to implementations disclosed herein.

FIG. 9 illustrates another example list according to interactions disclosed herein.

FIG. 10 illustrates rendering another example list during a voice only interaction according to implementations disclosed herein.

FIG. 11 illustrates rendering another example list during a multimodal interaction according to implementations disclosed herein.

FIG. 12 illustrates rendering another example list during a visual only interaction according to implementations disclosed herein.

DETAILED DESCRIPTION

Figure 1:
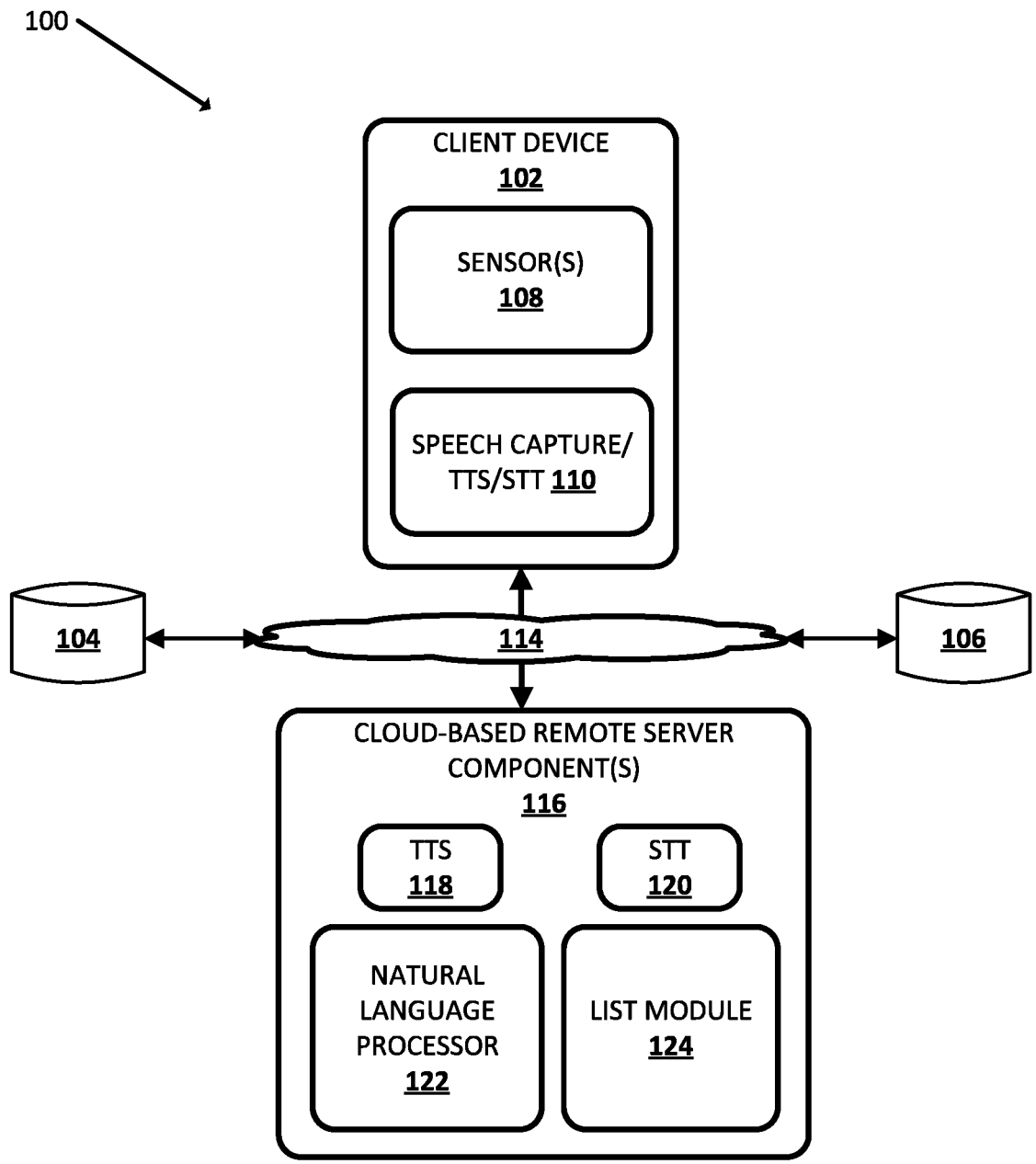
FIG. 1 is a block diagram illustrating an example environment in which various implementations disclosed herein can be implemented.

FIG. 1 illustrates an example environment 100 in which various implementations can be implemented. The example environment 100 includes client device 102. One or more cloud-based remote server components 116, such as natural language processor 122 and/or list module 124, may be implemented on one or more computing systems (collectively referred to as a cloud computing system) that are communicatively coupled to client device 102 via one or more local and/or wide area networks (e.g., the internet) indicated generally as 114.

Client device 102 may include, for example, one or more of: a desktop computing device, a laptop computing device, a tablet computing device, a touch sensitive computing device (e.g., a computing device which can receive input via touch from the user), a mobile phone computing device, a computing device in a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). In many implementations, client device 102 can be a multimodal client device. Additional and/or alternative client computing devices may be provided.

In various implementations, client device 102 may include one or more sensors 108 that may come in various forms. Sensors 108 can sense varying types of input to the client device 102 such as verbal, textual, graphical, physical (e.g., a touch on a display device including a touch sensitive projector and/or a touch sensitive screen of a computing device), and/or visual (e.g., a gesture) based input. Some client devices 102 may be equipped with one or more digital cameras that are configured to capture and provide signal(s) indicative of movement detected in their fields of view. Additionally or alternatively, some client devices may be equipped with sensors that detect acoustic (or pressure) waves, such as one or more microphones.

Sensors 108 can collect a variety of sensor data used in part to determine the current modality of client device 102 including: one or more cameras, an IMU, a gyroscope, a satellite navigation system unit (e.g., a GPS unit), a microphone, one or more pressure sensors, one or more proximity sensors, and/or additional sensor(s). In some implementations, sensor data used in determining device modality can be collected using different sensors that receive user interface input. For example, a microphone can be used to collect user interface input, and an IMU collecting IMU data indicating the position and/or pose of a client device can be used in determining modality. In other implementations, a sensor can be used to collect user interface input data as well as determine device modality. For example, a microphone can determine user interface input, and the same microphone can determine ambient noise surrounding the client device. In other words, the same sensor (e.g., the microphone) can have a set of sensor data corresponding to user interface input and a second set of sensor data unrelated to user interface input for use in determining device modality.

Client device 102 and/or cloud-based remote server components 116 can be in communication with one or more devices 104. Devices 104 can include any of a variety of devices including: Internet of Things devices such as smart appliances, smart thermostats, smart coffee makers, smart lights, smart locks, smart light switches, etc. The devices 104 are linked with the client device 102 (and/or a particular user of the client device 102) and with one another. For example, the devices 104 can be linked to a profile assigned to the client device 102 (and optionally other client devices) and/or can be linked to a profile assigned to a user of the client device 102. Collectively, the client device 102, other client device(s), and the devices 104 can define a coordinated ecosystem of devices. In various implementations, devices are linked to one another via a device topology representation that can be user created and/or automatically created, and that may define various client devices, various smart devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or alias(es) for the device (e.g. couch lamp, front door lock, bedroom speaker, kitchen assistant, etc.). In this manner, the identifiers of devices can be names, aliases, and/or locations of the respective devices that the user is likely to associate with the respective devices.

In many implementations, devices 104 can generate list output for client device 102. In some such implementations, list output generated by devices 104 can include output in a variety of modalities. For example, a smart thermostat can be controlled by voice interactions (e.g., a user gives a command to a standalone interactive speaker and/or a multimodal device) as well as physical interactions (e.g., controlling a display on a smart thermostat itself and/or generating new command input on a multimodal device). In many implementations, user command input can include a request for information for a device. As a further example, command input to a smart thermostat can be a request for temperatures over the past twelve hours. The smart thermostat can return a list of the temperature every hour for the past twelve hours. In some such implementations, the client device 102, upon receiving a list from a device, can dynamically partition the list into subsets in accordance with current device modality. In other implementations, device 104 can determine client device modality (e.g., by receiving sensor data and/or receiving an indication of device modality determined by the client device with the request for the list), can dynamically partition a list in accordance with the current modality of client device 102, and can transmit a partitioned list to client device 102. In other implementations, after partitioning a list into one or more subsets, device 104 can transmit individual subsets of the list to client device 102 on demand.

In many implementations, client device 102 can determine a list that correlates with received user input and/or receive a list from one or more third party agents 106 hosted by remote device(s) (e.g., another cloud-based component). Furthermore, one or more third party agents 106 can also perform function(s). For example, the client device 102 can interact with a third party agent 106 to cause a service to be performed, a transaction to be initiated, etc. In other implementations, third party agent 106 can, using the current modality of the client device 102, transmit an entire list to the client device. In many implementations, third party agent 106 can transmit one or more individual subsets of a list at the request of client device 102 instead of transmitting the entire list. Additionally or alternatively, third party agent 106 can transmit a list partitioned into subsets for all available client device modalities. Furthermore, third party agent 106 can transmit an unstructured list, and client device 102 can dynamically partition the list depending on client device modality in accordance with many implementations.

In many implementations, client device 102 may engage in dialog sessions with one or more users via user interface input devices and/or output devices of one or more client devices. In some implementations, client device 102 may engage in dialog sessions with a user in response to user interface input provided by the user via one or more user interface input devices of one of the client devices 102. In some of those implementations, the user interface input is explicitly directly to an automated assistant (not illustrated). For example, a user may speak a predetermined invocation phrase, such as "OK, Assistant," or "Hey, Assistant," to cause an automated assistant to begin actively listening.

In some implementations, client device 102 may engage in a dialog session in response to user interface input, even when that user interface input is not explicitly directly to an automated assistant. In many implementations, client device 102 may utilize speech recognition to convert utterances from users into text, and respond to the text accordingly, e.g., by providing visual information, by providing search results, by providing general information, and/or taking one or more response actions (e.g., playing media, launching a game, ordering food, etc.). In some implementations, the client device 102 can additionally or alternatively respond to utterances without converting the utterances into text. For example, the client device 102 can convert voice input into an embedding, into entity representation(s) (that indicate entity/entities present in the voice input), and/or other "non-textual" representations and operate on such non-textual representations. Accordingly, implementations described herein as operating based on text converted from voice input may additionally and/or alternatively operate on the voice input directly and/or other non-textual representations of the voice input.

Client devices 102 and cloud-based remote server components 116 may include one or more memories for storage of data and software applications, one or more processors for accessing data and executing applications, and other components that facilitate communication over a network. The operations performed by one or more computing devices 102 may be distributed across multiple computer systems.

In various implementations, client device 102 may include a corresponding speech capture/text-to-speech ("TTS")/speech-to-text ("STT") module 110. In other implementations, one or more aspects of speech capture/TTS/STT module 110 may be implemented separately from the client device 102. Speech capture/TTS/STT module 110 may be configured to perform one or more functions: capture a user's speech, e.g., via a microphone; convert that captured audio to text (and/or to other representations or embeddings); and/or convert text to speech. For example, in some implementations, because a client device 102 may be relatively constrained in terms of computing resources (e.g., processor cycles, memory, battery, etc.), the speech capture/TTS/STT module 110 that is local to the client device 102 may be configured to convert a finite number of different spoken phrases—particularly phrases that invoke an automated assistant—to text (or other forms, such as lower dimensionality embeddings). Other speech input may be sent to cloud-based remote server components 116, which may include cloud-based TTS module 118 and/or cloud-based STT module 120.

Cloud-based STT module 120 may be configured to leverage the virtually limitless resources of the cloud to convert audio data captured by speech capture/TTS/STT module 110 into text (which may then be provided to natural language processor 122). Similarly, cloud-based TTS module 118 may be configured to leverage the virtually limitless resources of the cloud to convert textual data into computer-generated speech output. In some implementations, TTS module 118 may provide the computer-generated speech output to client device 102 to be output directly, e.g., using one or more speakers. In other implementations, textual data (e.g., natural language responses) generated by STT module 120 may be provided to speech capture/TTS/STT module 110, which may then convert the textual data into computer-generated speech that is output locally.

Cloud-based remote server components 116 may include a natural language processor 122, a list module 124, the aforementioned TTS module 118, the aforementioned STT module 120, and other components, some of which are described in more detail below. In some implementations, one or more of the engines and/or modules of client device 102 and/or cloud-based remote server components 116 may be omitted, combined, and/or implemented in a component that is separate from client device 102. In some implementations, to protect privacy, one or more of the components such as natural language processor 122, speech capture/TTS/STT module 110, list module 124, etc., may be implemented at least in part on client device 102 (e.g., to the exclusion of the cloud).

In some implementations, client device 102 generates responsive content in response to various inputs generated by a user during a human-to-computer dialog session. Additionally or alternatively, client device 102 may provide the responsive content for presentation to the user as part of the dialog session. For example, responsive content can be generated in response to free-form natural language input provided via client device 102. As used herein, free-form input is input that is formulated by the user that is not constrained to a group of options presented for selection by the user.

Natural language processor 122 processes natural language input generated by users via client device 102 and may generate annotated output. For example, the natural language processor 122 may process natural language free-form input that is generated by a user via one or more user interface input devices of client device 102. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. Also, for example, in some implementations the natural language processor 122 may additionally and/or alternatively include a dependency parser (not depicted) configured to determine syntactic relationships between terms in natural language input.

In some implementations, the natural language processor 122 may additionally and/or alternatively include an entity tagger (not depicted) configured to annotate entity references in one or more segments such as references to people (including, for instances, literary characters, celebrities, public figures, etc.), organizations, locations (real and imaginary), and so forth. The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster", references to the same entity based on one or more contextual cues. For example, the coreference resolver may be utilized to resolve the term "there" to "Hypothetical Café" in the natural language input "I liked Hypothetical Café last time we ate there."

In many implementations, one or more components of the natural language processor 122 may rely on annotations from one or more other components of the natural language processor 122. For example, in some implementations, the named entity tagger may rely on annotations from the coreference resolver and/or dependency parsers in annotating all mentions to a particular entity. Also, for example, in some implementations the coreference resolver may rely on annotations from the dependency parser in clustering references to the same entity. In many implementations, in processing a particular natural language input, one or more components of the natural language processor 122 may use related prior input and/or other related data outside of the particular natural language input to determine one or more annotations.

List module 124 can retrieve a list related to user input, receive one or more subsets of a list from a third party agent, receive an unstructured list from a third party agent, determine the modality of client device 102, determine how to render a subset of the list, etc. In many implementations, upon receiving user interface input from the client device, list module 124 can retrieve a list which correlates with the user interface input and/or a client device action corresponding to the user interface input. Additionally or alternatively, a list can be retrieved from and/or transmitted to a cloud-based remote server component, a remote device, a third party agent, and/or the client device itself in response to user interface input received at the client device. For example, a user can ask a client device "how do I install a smart light switch", and the list module 124 can retrieve a list of instructions to install a smart light switch. In many implementations, the list of instructions to install a smart light switch can be retrieved from the smart light switch itself (i.e., retrieve the list from device 104). In other implementations, a list of instructions to install a smart light switch can be retrieved from a third party agent 106 associated with device 104. As a further example, the rendered list of instructions to install a smart light switch can change depending on client device modality. For example, a voice only interaction can provide the list as spoken output to the user using a speaker. A visual only interaction can render the list as video segments illustrating the steps as well as a textual description of each step. In some implementations, a multimodal interaction can include video segments illustrating each step on installing the smart light switch accompanied by audio output describing the step which corresponds to each video segment.

List module 124 can additionally determine the current modality of a client device. A variety of data collected by client device 102 and/or sensor(s) 108 can indicate client device modality including the type of client device, the status of visual and/or audio components of the client device, the location of the client device, the pose of the client device, the position of a user with respect to the client device, etc.

In many implementations, list module 124 can determine the type of client device such as a standalone interactive speaker, a cellular telephone, a touch screen interface on a hardware device, etc. For example, the same list can be rendered on a standalone interactive speaker, a multimodal client device such as a cellular telephone, and/or a visual only device such as a standalone display screen. Some client devices are inherently limited to a specific modality by one or more hardware components not included in the client device (e.g., a device without a speaker can be limited to visual only interactions and similarly a device without a display screen can be limited to voice only interactions). While the standalone interactive speaker, the cellular telephone, and/or a hardware display screen can all render the same list in accordance with their specific modality, the standalone interactive speaker, by lacking a visual display, is typically limited to voice only interactions. Similarly, a display screen on a hardware device such as a smart thermostat, can lack a microphone and/or speaker and is typically limited to visual only interactions. A cellular telephone (as well as other multimodal client devices) can engage additional modalities and therefore render a list in a variety of ways. In other words, a multimodal client device engaging in a voice only interaction can render similar (and often the same) subsets of a list as a standalone interactive speaker. Similarity, a multimodal client device engaging in a visual only interaction can render similar (or the same) subset(s) of a list as a visual only client device.

In many implementations, the location of a client device can be used in determining client modality. For example, a GPS unit can determine the position of a mobile device. Positions known to the client device can indicate the types of interactions a user might want to engage in. For example, a user may not want to render sounds when they are at a known "work" location and the list module 124 can determine a visual only interaction and/or a visual forward interaction. Similarly, a user may be less concerned with rendering sound at home, and a known "home" location can indicate to the list module 124 to determine a multimodal interaction. In some implementations, a client device can determine its location by connecting to a known Wi-Fi network (e.g., the client device knows when it is connected to the "home" Wi-Fi network).

Many client devices can be placed in a variety of poses by a user. For example, a cellular telephone can be placed in a "face down" position which will block a user's ability to see the phone screen. In some such implementations, a pose which inhibits a user's ability to see a display can indicate to list module 124 the client device is in a voice only or voice forward interaction. A variety of sensors can be used to determine the pose of a client device including an IMU, one or more cameras, etc.

Additionally or alternatively, the position of a user with respect to a client device can be utilized to determine device modality. For example, one or more cameras can determine a user's position with respect to the client device. Similarly, a proximity sensor can determine when a user is within a threshold range of a client device. In many implementations, a multimodal client device can be in different modalities depending on the location a user is from its screen. For example, a user holding a client device is typically very close to the screen and can see more detailed modality dependent visual components of a list. In other embodiments, a client device can determine a user is on the other side of a room from the client device. While the user on the other side of the room can still see some information on the client device display, list module 124 can determine the client device is engaging in a voice forward interaction and render modality dependent visual components with less dense visual information on the display.

A variety of other client device specific sensor data can be utilized by list module 124 in determining device modality. For example, an in-vehicle navigation system can utilize a variety of sensors to determine when the vehicle is in motion. In some such implementations, the list module 124 can determine the in-vehicle navigation system can engage in voice only or voice forward interactions while the vehicle is in motion, and can engage in any of the discrete interaction types within the multimodal spectrum while the vehicle is stopped.

In many implementations, list module 124 can determine the number of items in a subset using current client device modality, item complexity, and/or user opinion. The complexity of items in a list can be related to the number of attributes associated with each item. For example, glue is a less complex item with only a few attributes such as glue type, glue strength, etc. In contrast, a hotel reservation is a much more complex item than glue with many attributes such as price, the hotel having free Wi-Fi, the hotel having free breakfast, the hotel having a pool, the distance from the hotel to specific local attractions, online ratings, etc. In many implementations, a list can be partitioned into subsets with a smaller number of items for more complex items and/or subsets with a larger number of items for less complex items. Additionally or alternatively, a user can have a stronger opinion about some items within a list than other items within the list, as well as different users can care more about some items in a list than other users. For example, a professional chef is likely to have a greater user opinion when buying a frying pan compared with an average buyer.

In many implementations, more items can be grouped into a subset when a user has a higher opinion (e.g., a professional chef can be provided with a longer list of frying pans than an average user). In many implementations, user opinion can be determined using information known about all users. In other implementations, user opinion can be determined (with permission) from known information about a specific user (e.g., the user is known to be a professional chef, the user's gender, the user's age, the user's location, etc.). Additionally or alternatively, device modality can be utilized in determining the number of items in a list subset. For example, a subset can contain more items for visual interactions (e.g., a multimodal interaction, a visual only interaction, etc.) while items from the same list can be divided into a smaller subset for voice interactions (e.g., a voice only interaction). A list of complex items with a higher user opinion can be divided into smaller subsets containing fewer items for a voice only interaction, and similarly, the list of complex items and a higher user opinion can be divided into larger subsets containing more items for a multimodal interaction.

List module 124 in accordance with many implementations can render audio output and visual output for a client device, where the client device scrolls through visual output while it is being narrated. For example, a client device can render items on a list while the client device renders corresponding items on a list are scrolling on a display screen. In other implementations, rendered audio content does not exactly match content visually rendered on a screen. For example, audio output related to a list (e.g., source of a list, number of items on a list, etc.) can be rendered via one or more speakers while the client device renders the list. In other words, the list can be visually rendered on a display while audio output not including reading each item of the list can be rendered for a user.

Additionally or alternatively, list module 124 can determine how to present a list to a user. For example, additional information can be provided to the user at many positions in a list including the start of a list, the middle of a list, the end of a list, when no more items are available in a list, etc. For example, at the start of a list, a client device can render information about a list including the source of the list, number of total items in the list, etc. At the middle of the list, a client device can render a variety of information including how many additional items are in the list. In many implementations, a message at the middle of the list can be rendered in positions other than the true middle, as well as rendering the middle of the list information several times. For example, a middle of the list message can be rendered after item twenty five, fifty, and seventy five in a one hundred item list. End of list information can be rendered after the last item in a list and can indicate there are no more items in the list. Additionally or alternatively, a no more items message can be rendered after the completion of rendering a list (e.g., if a user requests an additional list subset during a voice only interaction and all subsets of the list have previously been rendered).

In many implementations, list module 124 can determine a user intent for user interface input for use in rendering a list. User intents can include trivia, discover, select then act, act but first select, etc. For example, a user can request information in a voice only interaction. User interface input which request a list of information can include a general facts and trivia intent such as "What are the islands of Hawaii?". General facts and trivia intents typically contain no indication of ordering or filtering in the command determined by user interface input. In many implementations, a list module 124 can render the entirety of shorter lists (e.g., a list which is partitioned into one or two subsets). For example, a list with ten items (or fewer) can typically be rendered in a voice only interaction in one or two subsets. In many implementations, a client device defaults to visually rendering longer lists and can provide a user a textual list for a multimodal client device even when a client is in a voice only interaction. For example, a user can ask a standalone interactive speaker "Who are hypothetical public figure's children?" where hypothetical public figure has fourteen children. In many implementations, the stand alone interactive speaker can render the total number of children (e.g., fourteen children), the first subset (e.g., the names of the first three children), and a message indicating a list of all of the children has been emailed to the user.

Additionally or alternatively, user interface input can have a discover intent which, in many implementations, can provide an ordering for the list. User interface input can indicate if the user wants a single item and/or several items rendered in a response. For example, "What is the tallest mountain?" can cause list module 124 to render a name of a single mountain. Additionally or alternatively, "What are the tallest mountains?" can cause list module 124 to render the names of several mountains starting with the highest. In many implementations, a user command can provide additional ordering of the list. For example, "What are the friendliest dog breeds?" indicates a subjective ordering of a list of dog breeds by how "friendly" each breed is.

Select then act user intents allow a user to select an item from a list and then act on that selection. For example, user interface input "I am looking for a comedy television show" can filter a list of television shows and allow a user to begin playing a show after selecting the show from the list. Additionally or alternatively, act but first select intents can allow an automated assistant to perform a requested action after receiving a selection from a user. For example, a user can provide the command "Turn the lights off". List module 124 can provide a user with a list of networked smart lights currently turned on, and the user can select one or more specific lights to turn off from the list. In a variety of implementations, list module 124 can additionally and/or alternatively contrast one or more list items with epithets. In other words, a description of the list item can be rendered in addition to the item of the list. In some implementations, list module 124 can determine an epithet for each item in the list. In other implementations, list module 124 can determine an epithet for list items as a subset is requested by a user. For example, in response to user interface input "I am looking for a comedy television show", list module 124 can determine "Hypothetical television show A, a mockumentary sitcom", "Hypothetical television show B, a classic comedy show from the 1990s", "Hypothetical television show C, starring Jane Doe" for list items "Hypothetical television show A", "Hypothetical television show B", and "Hypothetical television show C". In many implementations, an epithet can be based on the current client device modality. For example, in a voice only interaction, an audio description of the item can be rendered. Similarly, in a multimodal interaction, an audio description of the item as well as an additional image relating to the item (e.g., the logo of a television show) can be determined as an epithet for a list item.

FIG. 2 illustrates an image of a multimodal spectrum 200 in accordance with various implementations described herein. A multimodal spectrum includes a plurality of discrete modalities for multimodal client device interactions. In many implementations, a multimodal spectrum 200 can include voice only interactions 202, voice forward interactions 204, multimodal interactions 206 (also referred to as "intermodal interactions"), visual forward interactions 208, visual only interactions 210, etc.

Voice only interactions 202 can include a user speaking to and/or listening to a client device (i.e., audio interactions). For example, a standalone interactive speaker can engage in voice only interactions. Additionally or alternatively, a multimodal client device can engage in voice only interactions when, for example, a screen is not visible to a user. As an illustrative example, a cellular telephone can engage in voice only interactions when it is placed screen side down on a surface, a screen is turned off, a user is too far away to see a screen, etc. In many implementations, voice only interactions 202 include a user providing spoken input to a client device via a microphone coupled with a client device rendering output through a speaker. An example of a voice only interaction in accordance with many implementations is described in FIG. 3.

Additionally or alternatively, visual only interactions 210 include a user providing a client device with physical input (e.g., typing, clicking physical buttons, clicking buttons rendered by a user interface display, shaking a client device, etc.) coupled with output rendered by a client device on a display. Some client devices engaging in visual only interactions can lack a microphone and/or a speaker. In other implementations, a multimodal client device can engage in visual only interactions when audio interfaces are disabled. For example, a smart phone can engage in visual only interactions if the client device speaker is muted.

Multimodal client devices engaging in voice forward interactions 204, multimodal interactions 206, and visual forward interactions 208 can use a variety of input interfaces and/or output interfaces such as a microphone and speaker for voice interactions as well as a physical input and a display screen for visual interactions. For example, voice forward interactions 204 can include rendering a subset of a list via a speaker, rendering one or more subsets of the list on a display screen, and rendering a message to the user via the speaker indicating the portion of the list which can be viewed on the display screen.

Additionally or alternatively, in a multimodal interaction 206, a client device can render visual output including: an entire list, an ordered list, one or more subsets of a list, the total number of items in a list, the source of information in a list, etc., as well as audio output including: a first subset of a list, additional subsets of a list, and entire list, a source of information in a list, the total number of items in a list, the total number of items remaining to be rendered in a list, etc. In many implementations, a list module 124 of a client device (as illustrated in FIG. 1) can determine visual output to render via a display screen and/or audio output to render via a speaker for a list. An example of a multimodal interaction in accordance with many implementations described herein is illustrated in FIG. 4.

Similarly, a visual forward interaction 208 can, for example, be generated when one or more sensors determine a screen is visible to a user, but the user is at a threshold distance away from the screen and typically is unable to read detailed information on the screen. In some such implementations, a subset of a list can be rendered as spoken output via a speaker as well as limited visual output rendered via the display screen (e.g., a single subset of the list, the total number of items in the list, etc.). In some such implementations, a single item from the list can be rendered in a large font on the display screen while the specific item is narrated via the speaker.

Figure 3:
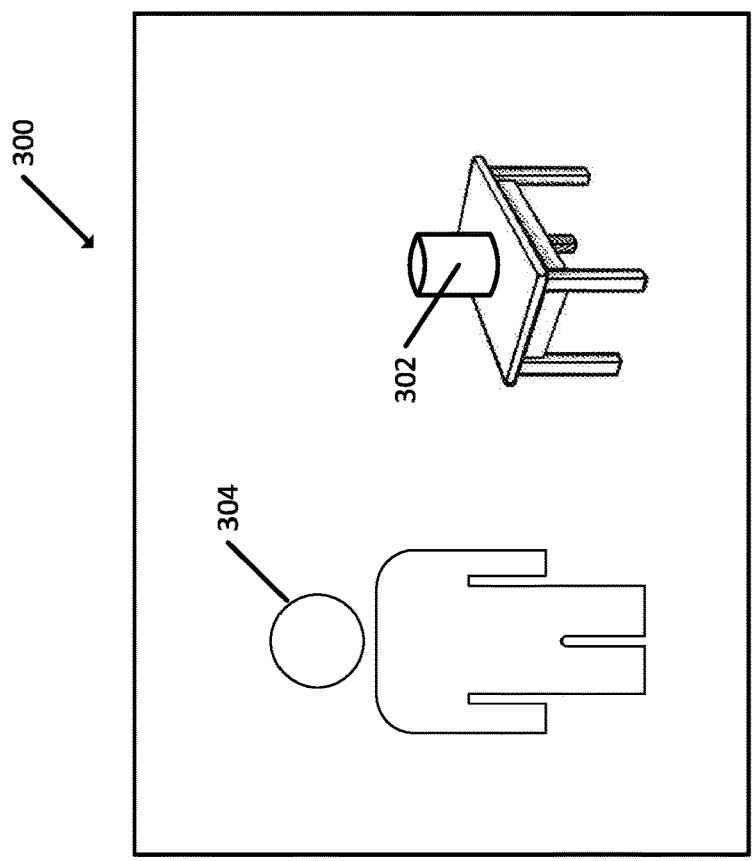
FIG. 3 illustrates an example of a user interacting with a client device according to implementations disclosed herein.

FIG. 3 illustrates an example image of a user engaging with a client device in a voice only interaction. Image 300 includes a client device 302 and a user 304. In many implementations, client device 302 can include a standalone interactive speaker. Additionally or alternatively, a multimodal client device can engage in voice only interactions based on the unavailability of physical input and/or visual output. For example, user 304 can request a list networked smart lights currently turned on by saying "Assistant, what lights are on?". A speaker can render a list of networked smart lights such as "Three bedroom lights, two living room lights, and a dining room light are currently turned on". In some such implementations, a user can speak an additional command instructing the client device to turn off one or more lights (e.g., "Assistant, turn off the three bedroom lights"). In many implementations, one or more additional audio responses can be rendered via the speaker in addition to the list of lights which are turned on, such as "Six lights total are on".

Figure 4:
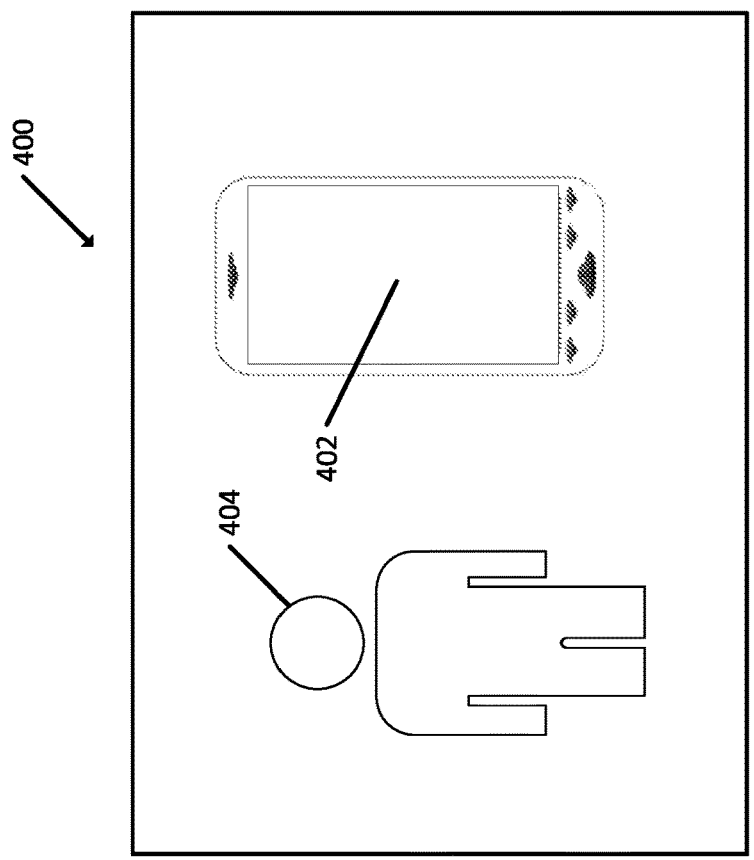
FIG. 4 illustrates another example of a user interacting with a client device according to implementations disclosed herein.

FIG. 4 illustrates an example image of a user engaging with a multimodal client device. Image 400 includes multimodal client device 402 (such as a cellular telephone) and user 404. In many implementations, a multimodal client device can engage in any discrete modality in a multimodal spectrum. A visual forward interaction, a multimodal interaction, and/or a voice forward interaction can share one or more audio components of rendered via a speaker and/or one or more visual components rendered via a display. For example, a user input generated by user 404 can request a list of networked smart light bulbs currently turned on. An audio component can be rendered via a speaker including one or more subsets of a list of networked smart lights which are turned on. Additionally or alternatively, a client device can render additional audio via a speaker indicating the total number of smart lights turned on, the total number of rooms with lights turned on, the number of networked smart lights total (i.e. the total number of lights turned both on and off), the number of smart lights turned on in the current room, etc. A visual component indicating a list of networked smart lights can be rendered via a display screen of a multimodal client device. In some implementations, additional information can be rendered visually via the display screen including the name of the networked environment, a list of all networked smart lights by room and further indicating the status of each networked smart light (e.g., if each light is turned on or off), networked smart lights placed in an interactive image of the environment (e.g., a schematic including rooms of the house where a user can interact with each smart light assigned to each room), etc. In some implementations, a user can provide an audio command to turn off one or more lights. In other implementations, a user can select one or more smart lights rendered on the display to turn off.

FIG. 5 illustrates an example list in accordance with many implementations disclosed herein. "Hypothetical list A" 500 is a ten item list, where each item is a single word. As an illustrative example, items 502-520 correspond with numbers one to ten. In other words list item one 502 is the word "one", list item two 504 is the word "two", list item three 506 is the word "three", list item four 508 is the word "four", list item five 510 is the word "five", list item six 512 is the word "six", list item seven 514 is the word "seven", list item eight 516 is the word "eight", list item nine 518 is the word "nine", and list item ten 520 is the word "ten". FIG. 6 illustrates "Hypothetical List A" rendered as a voice only interaction 600 via a speaker. Additionally, FIG. 7 illustrates "Hypothetical List A" rendered as a multimodal interaction 700 via a speaker and a display screen. Furthermore, FIG. 8 illustrates "Hypothetical List A" rendered as a visual only interaction 800 via a display screen. In a variety of implementations, discrete multimodal interactions can include a variety of information in addition to and/or in lieu of information rendered in FIGS. 6-8.

Voice only interaction 600 includes a client device rendering content to a user via a speaker. In the illustrated example, a client device can render the message 602 "Ten total items in the list" indicating the number of items in the list via a speaker before rendering the first subset of the list. Additionally or alternatively, after partitioning the list into two subsets, a client device can render the first subset. In the illustrated example, the first subset includes list items 502-512. Items in the first subset can be rendered via a speaker as items 604-614 (i.e., the words "one" through "six"). In some implementations, a client device can pause between each item in a subset for additional user interface input in response to the list. For example, a user can provide commands to the client device to interact with the list such as "pause", "stop", "continue", "wait ten seconds", etc. Additionally or alternatively, a client device can render a message 616 via the speaker asking the user if the client device should render an additional subset of the list such as rendering the message "Continue the list?". In many implementations, upon receiving affirmative user interface, a client device can render the second subset of the list. For example, a second subset containing items 618-624 can be rendered (i.e., the words "seven" through "ten"). In many implementations subsets of the same list can be of varying sizes (i.e., a first subset can contain more and/or fewer items than a second subset). For example, a list can be partitioned into subsets of two items. Any subset (e.g. a first subset, a final subset, etc.) of a list containing an odd number of items can contain either a single item subset and/or a three item subset. In some implementations, after determining a size of a subset, list module 124 can determine specific items in a subset, potentially reordering the list when it is rendered. For example, a list can be reordered in alphabetical order. Additionally or alternatively, items in a list can be randomly selected when partitioning the list into subsets. Random as used herein can include truly random and/or pseudo-random selections of items from the list. For example, a first subset can include randomly selected words "seven", "two", "one", "four", "eight", and "six" (not illustrated). In many implementations, additional audio output related to a list can be rendered via a speaker in a voice only interaction.

Multimodal interaction 700 includes a client device rendering content via a speaker as while rendering content via a display. In some implementations, a total number of items in a list can be rendered via a speaker, such as message 702 "Ten total items in the list". In other implementations, a total number of items in a list can be rendered via the display screen (not illustrated). Additionally or alternatively, a first subset of "Hypothetical list A" can be rendered via a display screen. For example, a first subset of items 704-712 (e.g., the words "one" through "five") can be rendered on a display screen. Additionally or alternatively, a second subset of "Hypothetical list A" can be rendered via the display screen. As a further example, a second subset of items 716-724 (e.g. the words "six" through "ten") can be rendered on the display screen. In other implementations, all list items 704-724 (e.g., the words "one" through "ten") can be rendered on the display screen (not illustrated). Additionally or alternatively, a user can scroll through rendered list items. As a further example, a client device can render via a speaker a message when a user has scrolled to the middle of a list, such as message 714 "five total items remaining in the list" indicating the number of remaining items. Furthermore, a client device in accordance with many implementations can render message 726 "the list is complete" via a speaker when the user scrolls to the end of the list. In some implementations, a client device can render additional information on the display screen at the end of the list, such as message 728 indicating the source of the list (e.g. "Source: www.hypotheticalurl.com"). Multimodal interaction 700 is merely an illustrative multimodal client device interaction, and additional and/or alternative content can be rendered via the speaker as well as the display screen.

Visual only interaction 800 includes a client device rendering content via a display screen. In some implementations, a message indicating the total number of items, such as message 802 "ten total items in the list", can be rendered before rendering items in a list. Additionally or alternatively, all ten items 804-822 of "Hypothetical List A" can be rendered on a display screen (i.e., the words "one" through "ten"). In some implementations, the entire list rendered on display can be visible to a user at one time. In other implementations, a user can scroll through items in a list. A message indicating the source of a list 824 "source: www-.hypotheticalurl.com" can be rendered on the display after the items in the list. In some such implementations, a message containing the source of the list can be an interactive prompt where the user can go to the source of the information by clicking part (or all) of the message. Additional and/or alternative content can be rendered via the display screen in accordance with several implementations.

FIG. 9 illustrates another example list in accordance with implementations disclosed herein. "Hypothetical list B" 900 is a four item list, where each item is a several word phrase and/or sentence. As an illustrative example, the first list item 902 is the phrase "unread text message from Jane", the second list item 904 is the phrase "unread text message from Bob", the third list item 906 is the phrase "unread text message from Jane", and the fourth list item 908 is the phrase "unread text message from Sam". FIG. 10 illustrates "Hypothetical list B" rendered as a voice only interaction 10000. Additionally, FIG. 11 illustrates "Hypothetical list B" rendered as a multimodal interaction 11000. Furthermore, FIG. 12 illustrates "Hypothetical list B" rendered as a visual only interaction 12000. In many implementations, discrete multimodal interactions can include a variety of content in addition to and/or in lieu of content rendered in FIGS. 10-12. Voice only interaction 10000 is rendered by a speaker of a client device. In the illustrated example, a message 1002 is rendered via the speaker indicating the number of items in the list, such as "Four total unread text messages". A list of text messages, as described, can be an interactive list (i.e., a user can interact with one or more items in the list). In some such implementations, an interactive list can be divided into single items subsets, with a pause, a question waiting for a response (e.g., "Do you want to reply to this item or go onto the next item in the list?"), other questions giving a user an opportunity to interact with the list ("Do you want to continue the list?"), and/or other additional audio indications (e.g., playing a sound) between rendering each item to allow a user to interact with a rendered list item. For example, a speaker can render the four items in the list 1004, 1008, 1012, 1016, as well as pauses 1006, 1010, 1014 between items in the list. In other words, list item 1004 "Unread text message from Jane", list item 1008 "Unread text message from Bob", list item 1012 "Unread text message from Jane" and/or list item 1014 "Unread text message from Sam" can be separated by one or more pauses. In many implementations, upon receiving user interface input indicating a user wants to interact with a current text message, a client device can pause rendering the list.

Multimodal interaction 1100 includes a client device rendering content via a speaker as well as a display screen. For example, audio output can accompany visual output. In some such implementations, audio content rendered via a speaker can include a message indicating the number of items in the list as well as other information about the list, such as message 1102 "Four unread text messages including two from Jane". The four items in "Hypothetical list B" can be visually rendered on a display screen in the order they appear in the list as items 1104-1110. In other implementations, items in a list can be displayed in a different order, such as by grouping text messages from a single individual (not illustrated). Additional and/or alternative information can be rendered by a speaker and/or the display screen.

Visual only interaction 1200 includes a client device rendering content via only a display screen. For example, the four items in "Hypothetical list B" can be rendered in the same order they appear in the list as items 1202-1210. In many implementations, a message can be rendered before items in the list, such as message 1202 "Four unread text messages including two from Jane", indicating the number of items and/or additional information about the list. Additionally or alternatively, a message can be rendered at the end of the list, such as message 1212 "No additional unread text messages" indicating the list is complete. In a variety of implementations, a user can physically select one or more items in the list to further interact with the item (e.g., clicking on message 1206 "Unread text message from Bob" to read the text message and/or respond to the text message.

Figure 13:
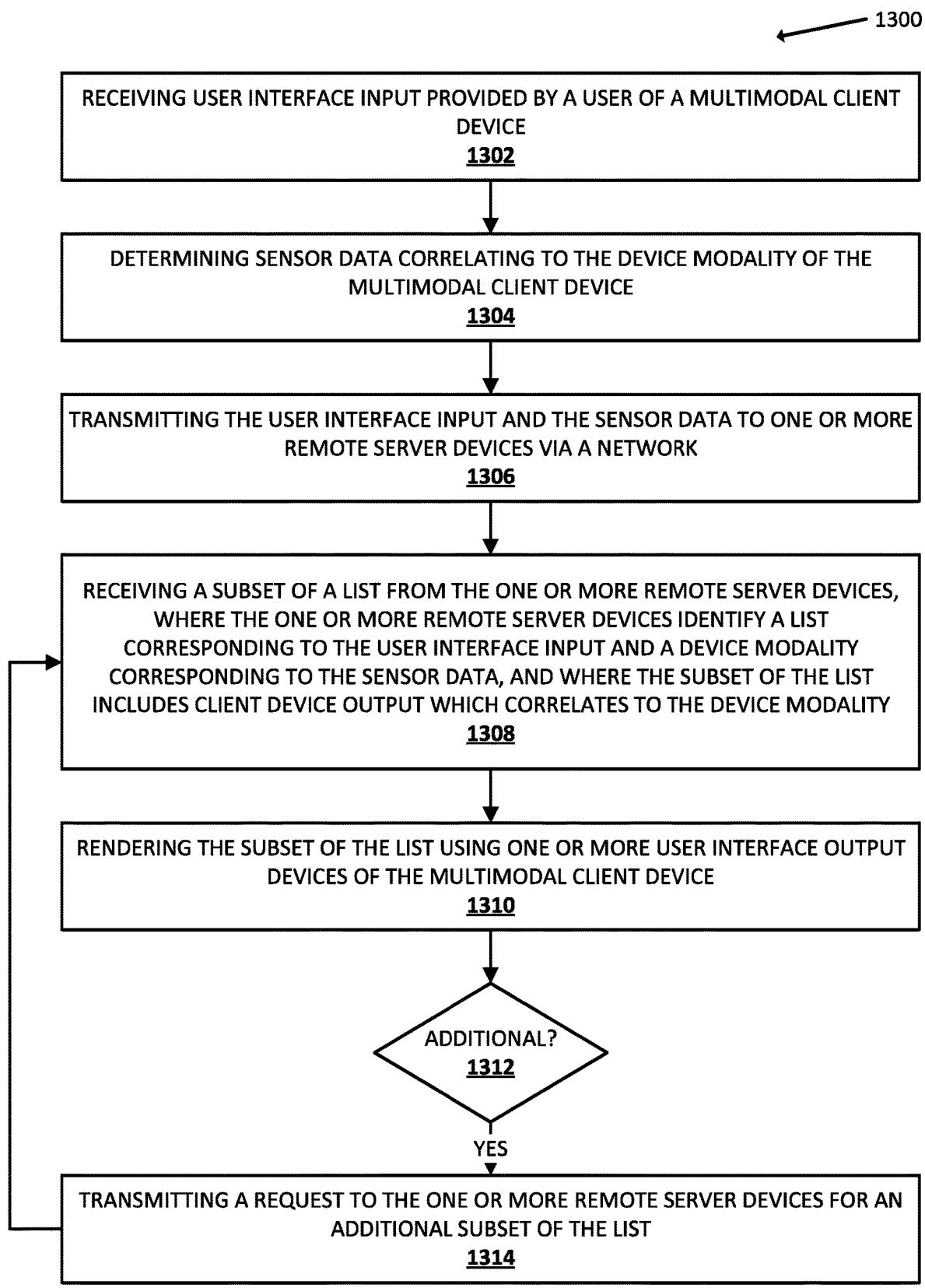
FIG. 13 is a flowchart illustrating a process in which various implementations disclosed herein can be implemented.

FIG. 13 is a flowchart illustrating an example process 1300 of generating a subset of a list according to various implementations disclosed herein. For convenience, the operations of FIG. 13 are described with reference to a system that performs the operations. This system may include various components of various computer systems, such as one or more components of client device 102. Moreover, while the operations of process 1300 are shown in a particular order, this is not meant to be limiting. One or more operations may be reordered, omitted, or added.

At block 1302, the system receives user interface input provided by a user of a multimodal client device. For example, the system can receive spoken user interface input, typed user interface input, gesture-based input, and/or other input.

At block 1304, the system determines sensor data correlating to the device modality of the multimodal client device.

At block 1306, the system transmits the user interface input and the sensor data to one or more remote server devices via a network.

At block 1308, the system receives a subset of a list from the one or more remote server devices. In many implementations, the one or more remote server devices identifies a list corresponding to the user interface input as well as a device modality corresponding to the sensor data. Additionally or alternatively, the subset of the list can include client device output which correlates to the device modality.

At block 1310, the system renders the subset of the list using one or more user interface output devices of the multimodal client device. For example, the system can render the subset using a using user interface output devices that correspond to the subset of the list and, as a result, that also correspond to the current modality of the multimodal client device.

At block 1312, the system determines whether an additional subset of the list should be rendered by the multimodal client device. In some implementations, user interface input provided by a user of the multimodal client device at block 1302 can indicate requesting an additional subset of the list. In other implementations, the multimodal client device can receive additional user interface input indicating the user wants an additional subset of the list in response to rendering the subset of the list at block 1310. If so, the system proceeds to block 1314 and transmits a request to the one or more server devices for an additional subset of the list. Upon transmitting the request, the system proceeds back to block 1308, receives a subset of the list from one or more remote server devices, then performs blocks 1310 based on the additional subset of the list. In various other implementations, the one or more remote server devices makes a determination to transmit an additional subset of the list. Additionally or alternatively, one or more remote server devices can transmit the entire list partitioned into subsets to the client device and upon making a determination that an additional subset of the list should be rendered, the multimodal client device can select the next additional subset of the list stored locally.

Figure 14:
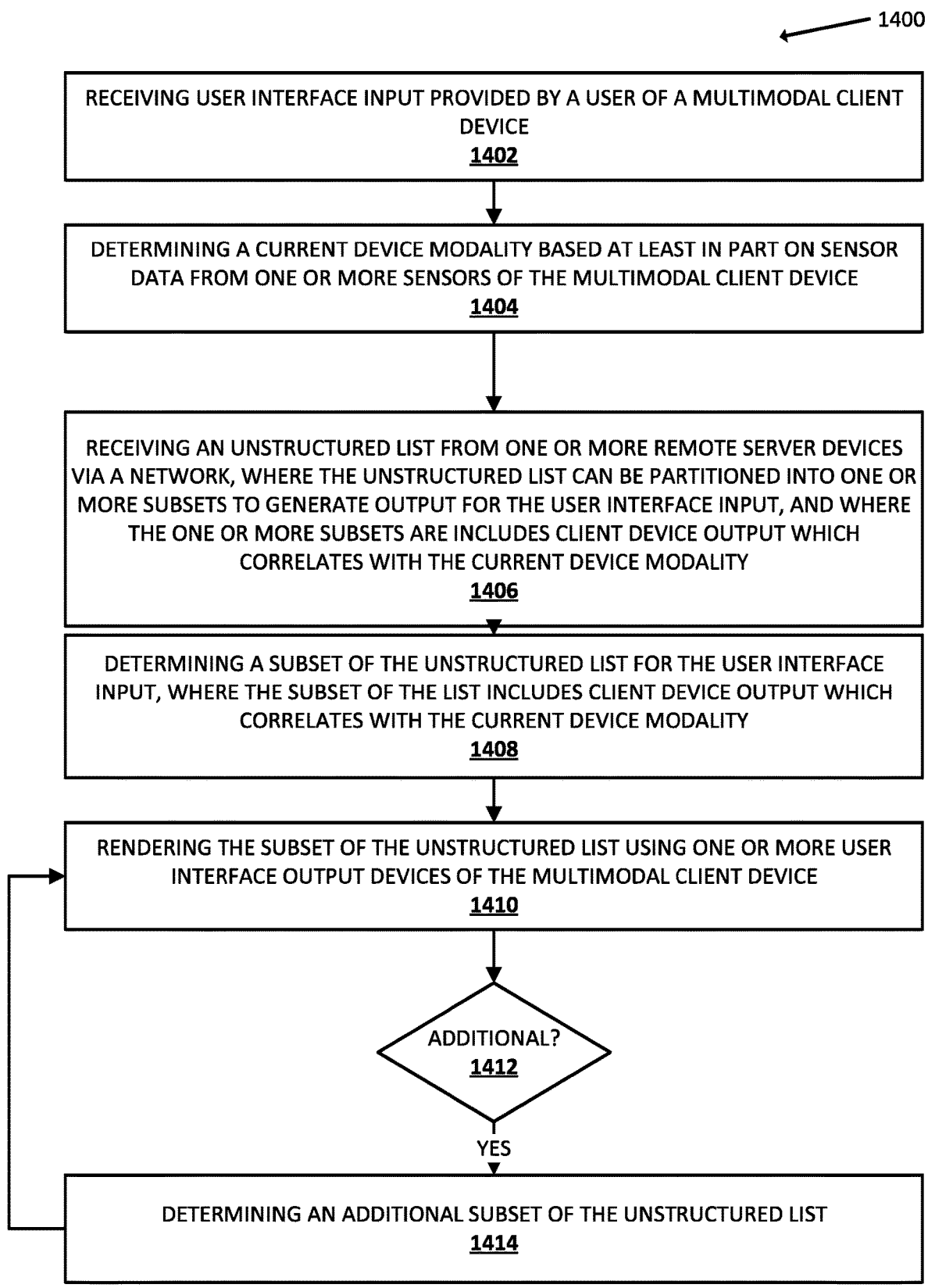
FIG. 14 is a flowchart illustrating another process in which various implementations disclosed herein can be implemented.

FIG. 14 is a flowchart illustrating an example process 1400 of generating a subset of a list according to various implementations disclosed herein. For convenience, the operations of FIG. 14 are described with reference to a system that performs the operations. This system may include various components of various computer systems, such as one or more components of client device 102. Moreover, while the operations of process 1400 are shown in a particular order, this is not meant to be limiting. One or more operations may be reordered, omitted, or added.

At block 1402, the system receives user interface input provided by a user of a multimodal client device. In many implementations, a client device itself can determine a corresponding action (and/or list) associated with user interface input. Additionally or alternatively, the client device can interface with remote server(s) in determining a corresponding action and/or list associated with the user interface input, and/or the corresponding action and/or list can be determined by remote system(s) based on transmission of the user interface input (and/or conversions thereof) to the remote system(s).

At block 1404, the system determines a current client device modality based at least in part on sensor data from one or more sensors of the multimodal client device. In many implementations, device modality can be determined by list module 124 as described in FIG. 1.

At block 1406, the system receives an unstructured list from one or more remote server devices via a network. In many implementations, the unstructured list can be partitioned into one or more subsets to generate output for the user interface input. Additionally or alternatively, the one or more subsets of the list can be tailored for the current device modality.

At block 1408, the system determines a subset of the unstructured list correlating with the user interface input. In some implementations, the subset of the list includes client device output which correlate with the current client device modality. In many implementations, list module 124 can determine one or more subsets of the unstructured list.

At block 1410, the system renders the subset of the unstructured list using one or more user interface output devices of the multimodal client device.

At block 1412, the system determines whether an additional subset of the unstructured list should be rendered by the multimodal client device. If so, the system proceeds to block 1414 and determines an additional subset of the unstructured list. Upon determining the additional subset of the unstructured list, the system proceeds back to block 1410 to render the subset using one or more user interface output devices of the multimodal client device.

Figure 15:
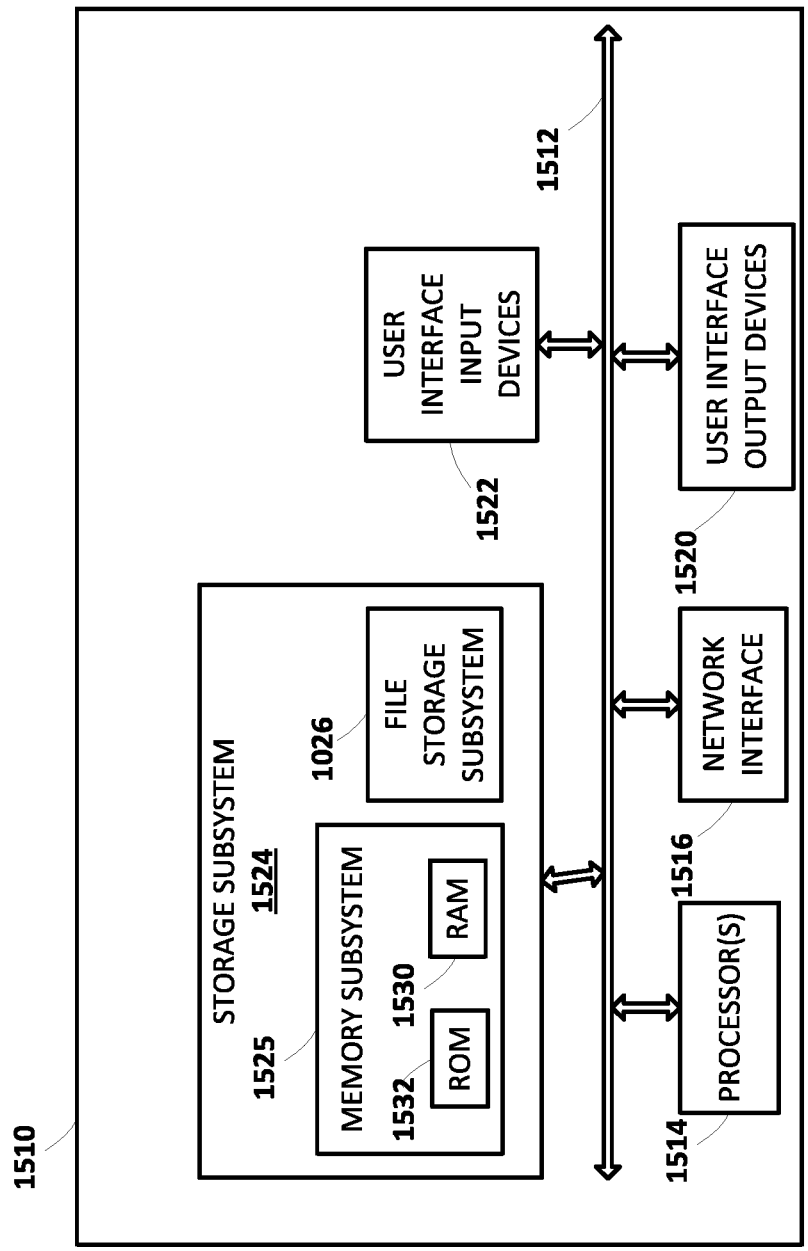
FIG. 15 is a block diagram illustrating an example architecture of a computing device.

FIG. 15 is a block diagram of an example computing device 1510 that may optionally be utilized to perform one or more aspects of techniques described herein. In some implementations, one or more of a client computing device, user-controlled resources module, and/or other component(s) may comprise one or more components of the example computing device 1510.

Computing device 1510 typically includes at least one processor 1514 which communicates with a number of peripheral devices via bus subsystem 1512. These peripheral devices may include a storage subsystem 1524, including, for example, a memory subsystem 1525 and a file storage subsystem 1526, user interface output devices 1520, user interface input devices 1522, and a network interface subsystem 1516. The input and output devices allow user interaction with computing device 1510. Network interface subsystem 1516 provides an interface to outside networks and is coupled to corresponding interface devices in other computing devices.

User interface input devices 1522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1510 or onto a communication network.

User interface output devices 1520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1510 to the user or to another machine or computing device.

Storage subsystem 1524 stores programming and data constructs that provide the functionality of some or all of the modules described herein. For example, the storage subsystem 1524 may include the logic to perform selected aspects of the processes of FIG. 13 and/or FIG. 14, as well as to implement various components depicted in FIG. 1.

These software modules are generally executed by processor 1514 alone or in combination with other processors. Memory 1525 used in the storage subsystem 1524 can include a number of memories including a main random access memory (RAM) 1530 for storage of instructions and data during program execution and a read only memory (ROM) 1532 in which fixed instructions are stored. A file storage subsystem 1526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1526 in the storage subsystem 1524, or in other machines accessible by the processor(s) 1514.

Bus subsystem 1512 provides a mechanism for letting the various components and subsystems of computing device 1510 communicate with each other as intended. Although bus subsystem 1512 is shown schematically as a single bus, alternative implementations of the bus subsystem may use multiple busses.

Computing device 1510 can be of varying types including a workstation, server, computing cluster, blade server, server farm, or any other data processing system or computing device. Due to the ever-changing nature of computers and networks, the description of computing device 1510 depicted in FIG. 15 is intended only as a specific example for purposes of illustrating some implementations. Many other configurations of computing device 1510 are possible having more or fewer components than the computing device depicted in FIG. 15.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving one or more instances of user interface input provided by a user of a multimodal client device;

determining, based on processing of the user interface input, that a list of a plurality of items is responsive to the user interface input;

determining, based at least in part on sensor data from one or more sensors of the multimodal client device, a current modality of the multimodal client device,
  wherein the sensor data based on which the current modality is determined is in addition to any sensor data generated by the one or more instances of user interface input;

determining, based on list attributes of the list, a first subset of the list to render wherein the list attributes include a number of items in the list and a number of characters in each item in the list, and wherein determining, based on the list attributes of the list, the first subset of the list to render comprises:
  when the current modality is a first modality, determining a first set of the items based on the number of items in the list, the number of characters in each item in the list, and the current modality being the first modality,
    wherein the first modality is one of a voice only modality, a visual only modality and a multimodal modality, and
  when the current modality is a second modality that is distinct from the first modality, determining a second set of the items based on the number of items in the list, the number of characters in each item in the list, and the current modality being the second modality,
    wherein the second set of the items is distinct from the first set of the items,
    wherein the second modality is another one of the voice only modality, the visual only modality and the multimodal modality; and causing the first subset of the list to be rendered by one or more user interface output devices of the multimodal client device, wherein when the first subset of the list is an interactive list, the causing comprises:
  causing a first interactive item of the interactive list, without causing a second interactive item of the interactive list, to be rendered to the user by one or more of the user interface output devices,
  monitoring, for a threshold duration after the first interactive item is rendered, for additional user input that interacts with the first interactive item, and
  in response to not receiving additional user input during the monitoring after the first interactive item is rendered, causing the second interactive item of the interactive list to be rendered to the user by one or more of the user interface output devices of the multimodal client device.

2. The method of claim 1, further comprising:
upon receiving one or more instances of affirmative user input provided by the user of the multimodal client device in response to a query rendered by the one or more user interface output devices asking if an additional subset of the list should be rendered:
  determining a second subset of the list to render based on the one or more list attributes and based on the current modality of the client device; and
  causing the second subset of the list to be rendered by the one or more user interface output devices of the multimodal client device.

3. The method of claim 2, further comprising:
receiving an unstructured list from a remote server, wherein the unstructured list is provided by a third party and has no list attributes; and
processing the unstructured list to determine one or more list attributes for use in determining the first subset of the list to render.

4. The method of claim 1, wherein the list is received by the multimodal client device from a remote server, and wherein generating the first subset of the list is by the multimodal client device.

5. The method of claim 4, wherein the list is received by the multimodal client device from the remote server in response to a request, transmitted to the remote server by the multimodal client device, that is based on the user interface input, and wherein determining the current modality of the multimodal client device is by the multimodal client device and occurs after transmission of the request.

6. The method of claim 1, wherein the current modality is the voice only modality and the first subset of the list is rendered only via one or more speakers of the one or more user interface output devices.

7. The method of claim 1, wherein the current modality is the multimodal modality and the first subset of the list is rendered via one or more speakers of the one or more user interface output devices and via a touch screen of the one or more user interface output devices.

8. The method of claim 7, wherein the first subset of the list is rendered via the one or more speakers of the one or more user interface output devices, and the list of the plurality of items is rendered via the touch screen of the one or more user interface output devices.

9. The method of claim 8, further comprising:
prior to rendering the list of the plurality of items via the touch screen, rendering additional information including the number of items in the list and a source of the list via the touch screen.

10. The method of claim 8, wherein determining the first subset of the list to render via the one or more speakers of the one or more user interface output devices is determined by randomly selecting three items in the list.

11. The method of claim 8, further comprising causing the number of items in the list to be rendered via the one or more speakers prior to rendering the first subset of the list.

12. The method of claim 8, further comprising:
determining an ordered list of the plurality of items by processing the list of the plurality of items by the multimodal client device, wherein the ordered list is in alphabetical order; and
causing the ordered list of the plurality of items to be rendered via the touch screen.

13. The method of claim 1, wherein the current modality is the visual only modality, and the first subset of the list is rendered only via a touch screen of the one or more user interface output devices.

14. The method of claim 1, further comprising:
determining, based on the processing of the first subset of the list, an epithet describing each item in the first subset of the list; and
causing the epithet to be rendered following each item in the first subset of the list by the one or more user interface output devices of the multimodal client device.

15. A method implemented by one or more processors, the method comprising:
receiving, via a network interface at one or more server devices remote from a multimodal client device, one or more instances of user interface input and a current modality of the multimodal client device,
  wherein the user interface input is provided by a user of the multimodal client device, wherein the user interface input is processed to determine a list of plurality of items responsive to the user interface input,
wherein the current modality is based at least in part on sensor data from one or more sensors of the multimodal client device, and
wherein the sensor data based on which the current modality is determined is in addition to any sensor data generated by the one or more instances of user interface input;
determining, based on list attributes of the list, a first subset of the list to render, wherein the list attributes include a number of items in the list and a number of characters in each item in the list, and wherein determining, based on the list attributes of the list, the first subset of the list to render comprises:
when the current modality is a first modality, determining a first set of the items based on the number of items in the list, the number of characters in each item in the list, and the current modality being the first modality,
wherein the first modality is one of a voice only modality, a visual only modality and a multimodal modality, and
when the current modality is a second modality that is distinct from the first modality, determining a second set of the items based on the number of items in the list, the number of characters in each item in the list, and the current modality being the second modality, wherein the second set of the items is distinct from the first set of the items,
wherein the second modality is another one of the voice only modality, the visual only modality, and the multimodal modality; and
transmitting, for rendering by one or more user interface output devices of the multimodal client device, the first subset of the list to the multimodal client device via the network interface, wherein when the first subset of the list is an interactive list, the transmittinq causes the multimodal client device to:
cause a first interactive item of the interactive list, without causing a second interactive item of the interactive list, to be rendered to the user by one or more of the user interface output devices of the multimodal client device,
monitor, for a threshold duration after the first interactive item is rendered to the user, for additional user input that interacts with the first interactive item, and
in response to not receivinq additional user input durinq the monitorinq after the first interactive item is rendered, cause the second interactive item of the interactive list to be rendered to the user by one or more of the user interface output devices of the multimodal client device.

16. The method of claim 15, further comprising:
transmitting the list of the plurality of items for additional processing by the multimodal client device in addition to transmitting the first subset of the list to the multimodal client device via the network interface.

17. The method of claim 16, wherein the current modality is the multimodal modality, the first portion of the list is rendered via one or more speakers of one or more user interface output devices of the multimodal client device, and the list of plurality of items is rendered via a touch screen of the one or more user interface output devices of the multimodal client device.

18. A method implemented by one or more processors, the method comprising:
receiving one or more instances of user interface input provided by a user of a multimodal client device;
receiving, based on processing of the user interface input by one or more servers remote to the multimodal client device, an unstructured list of a plurality of items responsive to the user interface input from the one or more servers via a network interface;
determining, based at least in part on sensor data from one or more sensors of the client device, a current modality of the multimodal client device,
wherein the sensor data based on which the current modality is determines is in addition to any sensor data generated by the one or more instances of user interface input;
determining, based on list attributes of the list, a first subset of the list to render wherein the list attributes include a number of items in the list and a number of characters in each item in the list, and wherein determining, based on the list attributes of the list, the first subset of the list to render comprises:
when the current modality is a first modality, determining a first set of the items based on the number of items in the list, the number of characters in each item in the list, and the current modality being the first modality,
wherein the first modality is one of a voice only modality, a visual only modality and a multimodal modality, and
when the current modality is a second modality that is distinct from the first modality, determining a second set of the items based on the number of items in the list, the number of characters in each item in the list, and the current modality being the second modality, wherein the second set of the items is distinct from the first set of the items,
wherein the second modality is another one of the voice only modality, the visual only modality and the multimodal modality; and
causing the first subset of the unstructured list to be rendered by one or more user interface output devices of the multimodal client device, wherein when the first subset of the list is an interactive list, the causing comprises:
causing a first interactive item of the interactive list, without causing a second interactive item of the interactive list, to be rendered to the user by one or more of the user interface output devices,
monitoring, for a threshold duration after the first interactive item is rendered, for additional user input that interacts with the first interactive item, and
in response to not receiving additional user input durinq the monitorinq after the first interactive item is rendered, causing the second interactive item of the interactive list to be rendered to the user by one or more of the user interface output devices of the multimodal client device.

* * * * *